(No Model.)
J. A. DAWSON.
COMBINED HARROW AND ROLLER.
No. 412,731. Patented Oct. 15, 1889.
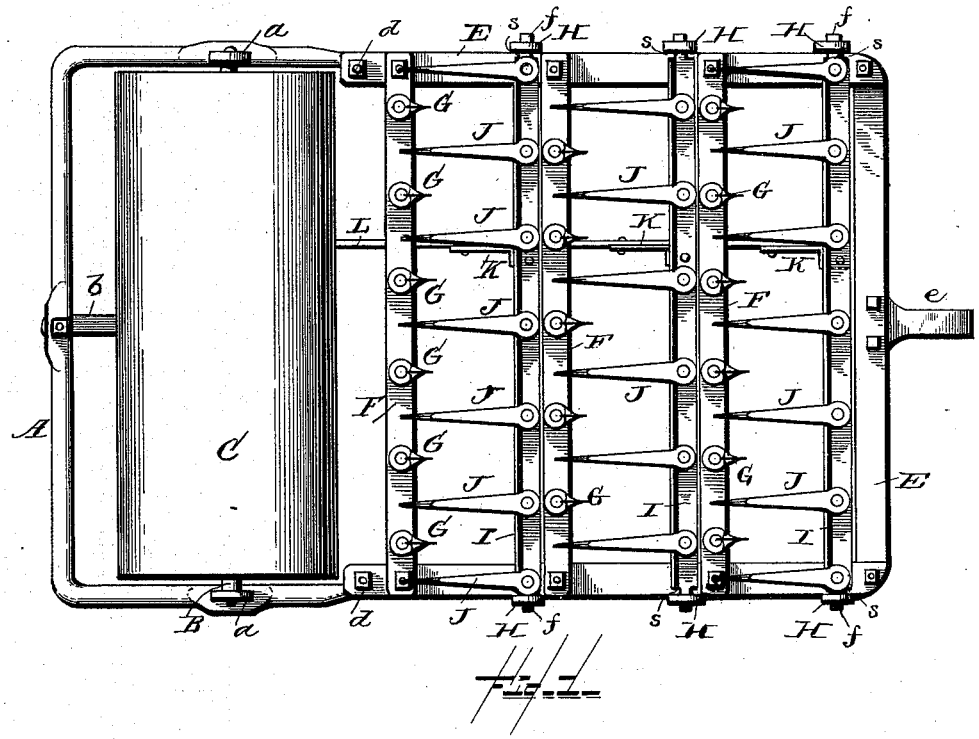
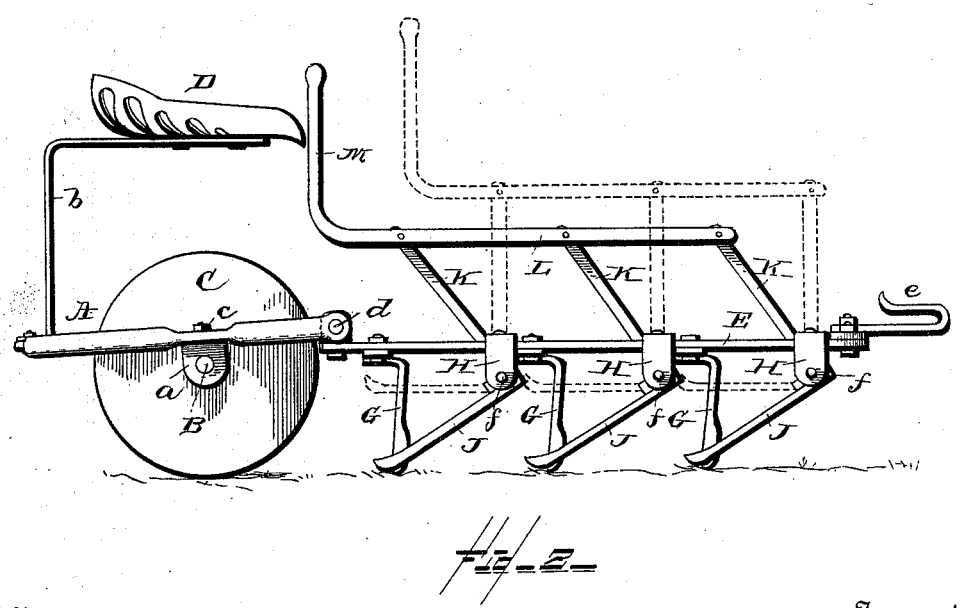
Witnesses
Albert Speiden
C. N. Scott
Inventor
James A. Dawson
By his Attorney
Chas. H. Fowler

UNITED STATES PATENT OFFICE.

JAMES A. DAWSON, OF TIPTONVILLE, TENNESSEE.

COMBINED HARROW AND ROLLER.

SPECIFICATION forming part of Letters Patent No. 412,731, dated October 15, 1889.

Application filed June 15, 1889. Serial No. 314,336. (No model.)

*To all whom it may concern:*

Be it known that I, JAMES A. DAWSON, a citizen of the United States, residing at Tiptonville, in the county of Lake and State of Tennessee, have invented certain new and useful Improvements in a Combined Harrow and Roller; and I do hereby declare that the following is a full, clear, and exact description of the same, reference being had to the annexed drawings, making a part of this specification, and to the letters of reference marked thereon.

This invention relates to certain new and useful improvements in agricultural implements of that type styled "combined harrows and rollers;" and it has for its object to provide a device of this kind which shall be compact and durable, and to provide the same with a trash-ejector, providing also means for raising and lowering the ejector to throw it into or out of operation.

The invention is clearly illustrated in the accompanying drawings, which, with the letters of reference marked thereon, form a part of this specification, and in which—

Figure 1 is a bottom plan view of a combined harrow and roller provided with my improvements. Fig. 2 is a side view of the same.

The invention in the present instance resides in the peculiar combinations and the construction, arrangement, and adaptation of parts, all as more fully hereinafter described, shown in the said drawings, and then particularly pointed out in the appended claims.

Referring now to the details of the drawings by letter, A designates the main frame, formed with the bearings *a* for the axle B, which carries the roller C.

D is the driver's seat, carried by a suitable support *b*, attached to the rear cross-bar of the frame A. The bearings *a* for the axle are formed of a piece of metal, each having a shank, which is passed through an opening in the frame, which at these points is flattened, as shown, and the extended end of the shank is provided with a suitable nut *c*, for holding the same in place.

E is the harrow-frame, formed with two sides and an end and pivotally connected to the roller-frame, as at *d*, so as to allow the two frames to be vertically movable independent of the other.

The forward cross-bar of the harrow-frame is provided with suitable means for the attachment of the draft, that in the drawings being simply a hook *e*, to which the draft-hook may be connected.

Attached to the side bars of the harrow-frame in any suitable manner are the transverse bars F, to which are attached the harrow-teeth G in any well-known manner, so that they may be readily detached in case of breakage. In the drawings I have shown the teeth connected to the bars by means of bolts and nuts; but other analogous means may be employed.

Attached to the side bars of the harrow-frame are the ears or lugs H, the vertical portions of which extend upon the outside of the frame and are provided with the holes *f*, in which are loosely journaled the transverse bars I, to which are attached in any suitable manner, so that they may be readily detached or applied, the teeth J, so attached to the bars that when the said teeth are thrown down into their operative position they shall extend at an angle of about forty-five degrees from the teeth G, as shown in Fig. 2. To each of the bars I is attached an upright arm K, the upper ends of which are connected by the longitudinal bar L, having its rear end turned upward in close proximity to the driver's seat to form a handle M, by which it may be actuated to simultaneously raise or lower all of the bars I, and consequently all of the teeth J. These teeth J serve to gather and eject the vines and trash from the ground and being operated upon, they being shown in their operative position in full lines in Fig. 2 and in their inoperative position by dotted lines in the same figure.

In order to produce the best results and to relieve the teeth J from undue strain in operation, I have found it desirable to so arrange the bars I and the lugs in which they are journaled that the said bars, and consequently the teeth which they carry, shall be free to vibrate laterally; and to this end I have made the said bars with shoulders *s* near their ends and have made their journal-bearings sufficiently large to allow the bars to play endwise, being limited in their movement by the said shoulders, as will be readily understood.

The trash-ejector teeth are so arranged that they travel in the spaces between the harrow-teeth, as shown.

What I claim as new is—

1. The combination, with the roller-frame and the roller, of the harrow-frame pivotally connected to the roller-frame and provided with harrow-teeth and teeth for ejecting trash, substantially as shown and described.

2. The combination, with the roller and its frame, of the harrow-frame, the harrow-teeth attached thereto, and the trash-ejector teeth on said harrow-frame, and means for raising and lowering the ejector-teeth independent of the harrow-frame, substantially as and for the purpose specified.

3. The combination, with the roller-frame, the roller, and the harrow-frame and the harrow-teeth, of the trash-ejector teeth on the harrow-frame and free to vibrate laterally, substantially as shown and described.

4. The combination, with the roller and its frame and the harrow-frame and its teeth, of the lugs attached to the side bars of the harrow-frame, the bars I, having bearings in said lugs and formed with shoulders and free to move endwise in their bearings, and the teeth J, attached to said bars, substantially as and for the purpose specified.

5. The combination, with the roller and its frame, of the harrow-frame pivotally connected to the roller-frame, the harrow-teeth on the harrow-frame, the bars I, journaled in bearings on the harrow-frame, the arms K, attached at their lower ends to said bars, and the longitudinal bar L, connecting the upper ends of said arms, substantially as shown and described, and for the purpose specified.

6. The combination, with the roller and the harrow-teeth and their frames, of the trash-ejector teeth arranged at an angle of about forty-five degrees with the harrow-teeth and in the spaces between the said harrow-teeth, as set forth.

In testimony that I claim the above I have hereunto subscribed my name in the presence of two witnesses.

JAMES A. DAWSON.

Witnesses:
A. F. EASTWOOD,
JNO. H. CRONAN.